Sept. 12, 1967 G. D. HAVILLE 3,340,978
BILL ACCEPTANCE AND DETECTION SYSTEM
Filed April 30, 1965 4 Sheets-Sheet 1

INVENTOR.
GEORGE D. HAVILLE
BY Donald J. Shields
ATTORNEYS

Sept. 12, 1967    G. D. HAVILLE    3,340,978
BILL ACCEPTANCE AND DETECTION SYSTEM
Filed April 30, 1965    4 Sheets-Sheet 2

INVENTOR.
GEORGE D. HAVILLE
BY Donald J. Shields
ATTORNEYS

Sept. 12, 1967        G. D. HAVILLE        3,340,978

BILL ACCEPTANCE AND DETECTION SYSTEM

Filed April 30, 1965        4 Sheets-Sheet 3

INVENTOR.
GEORGE D. HAVILLE
BY Donald J. Shields
ATTORNEYS

Sept. 12, 1967

G. D. HAVILLE

3,340,978

BILL ACCEPTANCE AND DETECTION SYSTEM

Filed April 30, 1965

INVENTOR.
GEORGE D. HAVILLE
BY Donald J. Shields
ATTORNEYS

United States Patent Office

3,340,978
Patented Sept. 12, 1967

3,340,978
BILL ACCEPTANCE AND DETECTION SYSTEM
George D. Haville, Santa Barbara, Calif., assignor to Advance Data Systems Corporation, Beverly Hills, Calif.
Filed Apr. 30, 1965, Ser. No. 452,065
16 Claims. (Cl. 194—4)

This invention relates generally to systems of the type used for controlling dispensing apparatus to make change and/or dispense merchandise for paper currency. More particularly, the invention relates to a new and improved bill acceptance and detection unit for receiving and evaluating the authenticity of paper money of a preselected denomination.

Due to the relatively high costs of sales personnel, merchandising through vending machines has, in recent years, taken on increasing significance as a sales medium. To accommodate users of such vending machines, a number of coin changing devices have been developed which either make change for a larger coin or, in conjunction with a suitable dispensing mechanism, issue selected merchandise along with an amount in change equal to the difference between the price of the merchandise and the coin inserted into the machine.

In order to extend the versatility and utility of dispensing machines to lower priced merchandise, a need has arisen for small, inexpensive and reliable devices capable of changing paper money or dispensing merchandise and change for paper money. In devices of this type which have heretofore been produced, a bill is placed in a special tray which is adapted to slide into a detection unit for testing the bill to determine whether or not it is authentic. Generally, the test is a moving test made as the bill is moved past a testing station. Various photocell and electro-magnetic test methods are used.

In previously produced devices, the reliability of the test was generally proportional to the expense of the device. In order to get reliable testing it was necessary to increase the complexity and consequently the expense of the detection mechanism. There has also been the same relationship between size and reliability. Generally, increased reliability called for a larger size or more complex detection unit.

Prior to the introduction of the device described in this application, there was no commercially available bill changer which was suitable for convenient and economical direct inclusion in, or addition to, a vending machine. The most prevalent bill changer was a separate floor model unit. In order to be useful on a vending machine, a device would have to be at least as reliable as the present devices of acceptable reliability and yet be much more compact and inexpensive than such devices.

In the previously introduced bill acceptance and detection devices, a mechanism capable of making change and/or dispensing merchandise is coupled to the detection unit and if the bill placed in the sliding tray is accepted as authentic, change and/or merchandise is dispensed therefor. If the detection unit indicates that the bill is not authentic, the bill is not accepted but rather is returned to the consumer.

In view of the ever increasing need for devices capable of dispensing merchandise of both high and low price and/or making change for paper currency, a considerable amount of time, expense and effort has been devoted to the development and improvement of devices for performing such functions.

Accordingly, it is an object of this invention to increase the reliability of detection and decrease the size and expense of manufacture in a bill acceptance and detection unit.

Another object is to increase the ruggedness, reliability and simplicity of construction so as to require a minimum of parts in a bill acceptance and detection unit.

A further object is to improve the detection circuit of the bill acceptance and detection unit so as to reliably detect valid currency of varying ages and conditions.

A further object is to inexpensively increase the discrimination capacity of each detection sensor or photocell in a bill acceptance and detection unit so as to increase the reliability of bill detection without increasing the number of photocells required or the complexity of the comparison decision making circuitry.

A further object is to convert increases and decreases in illumination at the detection sensors or photocells in a bill acceptance and detection unit into a summed uni-polarity signal suitable for operating an electronic trigger controlling the making of change and/or dispensing merchandise without sacrificing any of the illumination increase and decrease information.

In an illustrative embodiment of the present invention, the detection unit is contained in the housing of a bill acceptor which provides for hand access to the detection area and a sliding door for actuating the detection unit and denying access to the bill being tested. The detection unit includes photocells recessed in shaped area cavities in a detection head. The bill to be tested is placed in the detection area on a transparent shelf and light from a light source controlled by a compensating control device is transmitted through the transparent detection area, through the bill and into the shaped cavities. The illumination detected by the photocells in the shaped cavities is compared and summed and then converted to a uni-polarity signal in a special detection circuit. This uni-polarity signal is then used to activate a trigger which activates a mechanism controlling the dispensing of the change and/or merchandise.

The bill detector described in the present application has many very important advantages over bill detectors which have been previously proposed or introduced. It is the first commercially available bill detector which is suitable for use on the ordinary soft drink, coffee, sandwich vending machines either as an integral part of a new vending machine, or as a relatively unobtrusive addition to an old vending machine.

Among the advantages of the present bill detector which make it suitable for use on such vending machines are its extreme compactness, simplicity and inexpensiveness. It has the advantage of extremely high reliability despite its very small size and inexpensiveness. It also provides a high degree of bill security so as to frustrate would-be cheaters attempting to get change or merchandise while retaining possession of the inserted bill.

Another very interesting advantage is that despite its extreme simplicity and compactness, it has the ability to accept valid bills regardless of age or condition rather than rejecting bills which are not in almost perfect condition as do some of the commercially available bill acceptance machines. In addition to the advantages noted above, the bill detector described in this application eliminates the need for sliding trays or any other bill transfer machinery. Furthermore, it has the advantage of stationary testing and thus eliminates the need for any complex automatic machinery for moving the bill past the test station as is necessary in some of the prior art bill detectors.

A very interesting advantage of the bill invention is the way in which the amount of useful validity information derived by each individual photocell from the bill being tested is greatly increased over prior art detectors. This has the advantage of allowing the use of fewer photocells to achieve a desired degree of reliability while decreasing the complexity and cost both as to the detection mechanism and as to the comparison and decision making circuits which will use the outputs of the photocell. The shaped area design has the advantage of making the detector truly unique to the type of currency for which it was designed and thus greatly decreases the possibility that anything other than valid currency will be accepted.

Other advantages include limitations on the maximum amount of light furnished to the detection system, limitations on the light source maximum voltage and limitations on the fluctuation in the lamp intensity, all of which serve to increase the reliability of the detection system as well as provide such reliability over a long operating life.

Another advantage is extremely accurate and reliable summing of the error signals in an inexpensive, very simple comparison and decision circuit. Coupled with this is the advantage of conversion of positive and negative error signals into a uni-polarity signal capable of triggering an electronic switch sensitive to a single type of signal. This increases reliability by insuring that stray signals or improper signals will not trigger the dispensing mechanism. Another advantage is that the positive and negative error signals can be converted to a uni-directional signal acceptable to the electronic switch without sacrificing any portions of the error signals in order to obtain the uni-polarity signal.

The novel features which are believed to be characteristic of the invention, both as to its organization and method construction and operation, together with further objections and advantages thereof, will be better understood from the following description considered in connection with the accompanying drawings in which illustrative embodiments of the invention are disclosed by way of example. It is to be expressly understood that the drawings are for the purposes of illustration and description only and do not constitute a limitation of the invention.

Figure 1:
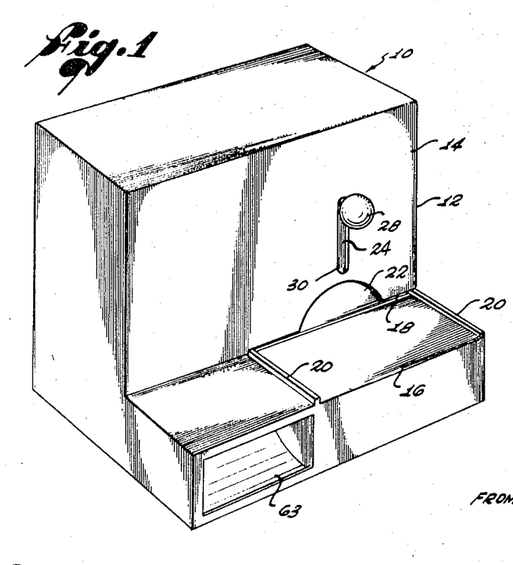
FIGURE 1 is a perspective view of a device embodying the improved bill acceptance and detection unit of the present invention in combination with an appropriate device for dispensing merchandise and/or change.

Referring now to the drawings, and particularly to FIGURE 1 thereof, a combined bill acceptance, detection and dispensing apparatus 10 includes an external housing 12 of steel or any other structural material suitable for resisting and discouraging tampering with the device by unauthorized personnel. The housing 12 includes a vertically disposed front panel 14 and a horizontal platform surface 16 extending to the base of the panel. All of the components of the bill detection system are contained within the housing 12 behind the panel 14, and a bill must be moved past the panel 14 into proper alignment with the detection system before the bill can be tested. To this end, the base of the panel 14, adjacent the surface 16, is provided with a horizontal slot 18 through which a bill can be inserted. Insertion is accomplished by resting the bill upon the surface 16 and sliding it manually along the surface, towards the panel 14 and through the slot 18. To aid in guiding the bill through the slot 18, a pair of bill guides 20 are affixed to the surface 16, and the panel 14 is also provided with an oval cut-out 22 to insure adequate clearance for the fingers of one hand during placement of the bill in the detection unit.

Although the illustrated embodiment of the apparatus 10 is a configuration wherein the surface 16 is embodied into the same construction as the acceptance and detection unit of the present invention, the invention is not to be construed as being so limited, and the surface 16 may be separately provided at the site where the acceptance and detection unit is eventually used.

Figure 2:
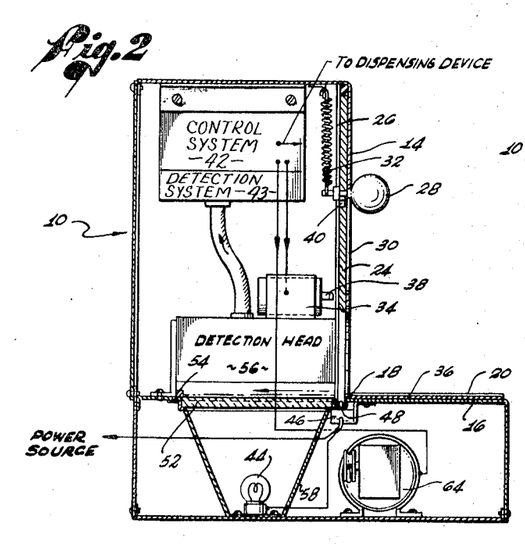
FIGURE 2 is a left-side elevational view of the apparatus of FIGURE 1, portions of the external housing and internal components being broken away, and illustrating the device prior to insertion therein of a bill to be tested.
Figure 3:
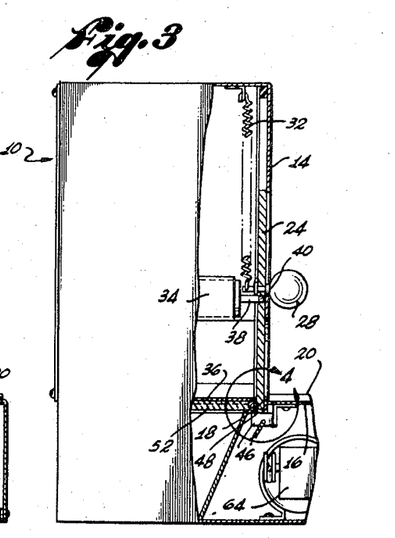
FIGURE 3 is a fragmentary sectional view, similar to FIGURE 2, and illustrates the device after insertion of a bill and during test by the detection unit.

Referring now additionally to FIGURES 2 and 3, a vertically disposed slide plate or door 24 is supported behind and immediately adjacent the front panel 14, the opposite ends of the slide plate being carried in a pair of channel members 26, so that the plate is capable of sliding movement relative to the panel. The slide plate 24 carries a handle 28 which extends through a vertical clearance slot 30 in the panel 14, so that the slide plate can be moved via the handle from the opposite side of the panel. The slide plate 24 is biased to its normally raised position shown in FIGURE 2 by a return spring 32 coupled to the inside end of the handle 28 or to any other convenient portion of the slide plate structure. When the slide plate 24 is moved to its lowered position shown in FIGURE 3, the slide plate overlies the slot 18 and opening 22 in panel 14, thus denying access to the detection unit.

A solenoid 34 is mounted within the housing 12 behind the slide plate 24, and this solenoid is adapted to lock the slide plate in its lowered position, after insertion of a bill 36 to be tested and manual lowering of the slide plate via movement of the handle 28 by the consumer. As will be apparent in FIGURES 2 and 3, the solenoid 34 has a normally extended solenoid plunger 38 which is biased against the rear surface of the slide plate 24 when the plate is in the raised position of FIGURE 2. The slide plate 24 is provided with a hole or recess 40 extending into the plate from its rear face. The recess 40 is in vertical alignment with the solenoid plunger 38, and its central axis is spaced above the central axis of the plunger a distance equal to the travel of the plate between its raised and lowered positions. When the slide plate 28 is moved to the lowered position of FIGURE 3, the solenoid plunger 38 engages the recess 40 and thereby locks the plate in the down position. Hence, the solenoid plunger 38 and recess 40 essentially provide a detent mechanism for locking the slide plate 24 and thereby closing off the openings 18 and 22 in the panel 14 after a bill has been inserted into the detection unit.

Figure 5:
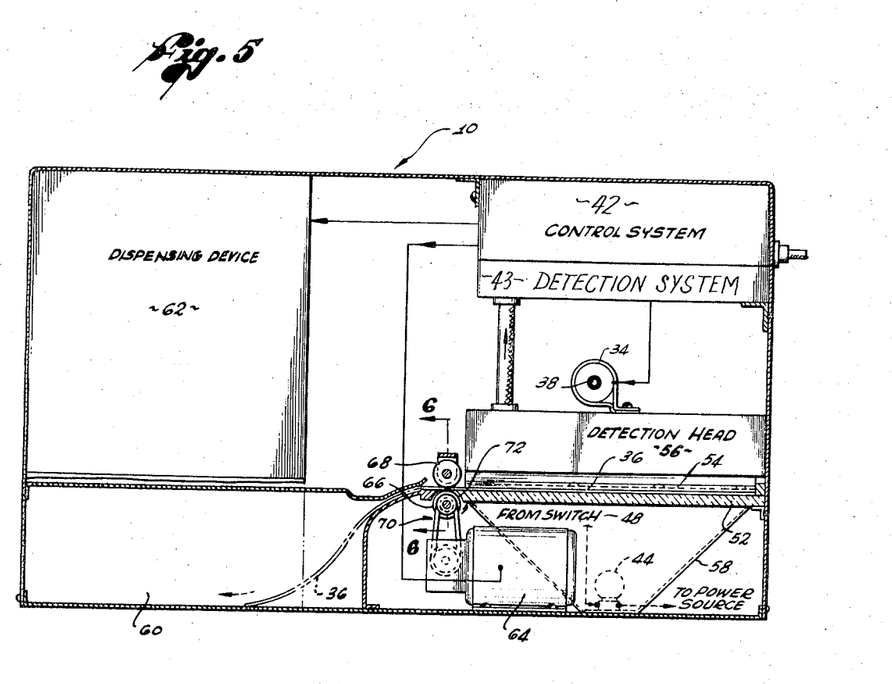
FIGURE 5 is a front elevational view of the apparatus in FIGURE 1, portions of the housing and internal components being in section.

After the bill 36 has been appropriately tested and processed, i.e., as by removal of an authentic bill or rejection of an unacceptable bill, the solenoid 34 is momentarily energized by a signal from a control system 42 (see FIGURES 2 and 5). Energization of the solenoid 34 causes the plunger 38 to retract from the recess 40 and thereby release the slide plate 24 so that the spring 32 can return the slide plate to its normally raised position. This clears the openings 18, 22 in the panel 14, and enables the consumer to either remove a rejected bill or insert another bill if the previous bill has been accepted and deposited by the apparatus 10.

Figure 4:
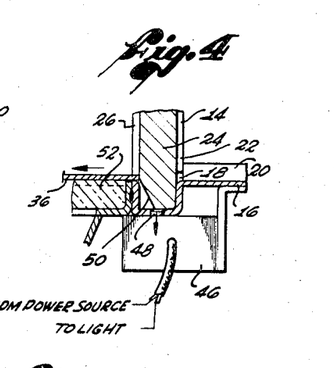
FIGURE 4 is an enlarged, fragmentary sectional view of the area 4 in FIGURE 3, and illustrates the manner in which the detection unit is activated following insertion of a bill to be tested.

As will be apparent in FIGURE 4, lowering of the slide plate 24 not only closes the openings 18, 22 but also completes an electrical circuit between a source of electrical power and a light source 44 (see FIGURES 2 and 5) which is used in photoelectrically testing the bill 36 after it has been inserted into the detection unit. To accomplish this energization of the light source 44, an electrical switch 46, having a pushbutton actuator 48, is mounted so that the pushbutton will be depressed by the lower end of the slide plate 24 when the plate is moved to its lowermost position shown in FIGURES 3 and 4.

It will also be observed in FIGURE 4 that the rear face of the slide plate 24, near the lower end thereof, is provided with a bevel face 50. If the bill 36 has not been fully inserted into the detection unit behind the panel 14, the bevel face 50 tends to drive the bill to a fully inserted position when the slide plate 24 is lowered.

Figure 6:
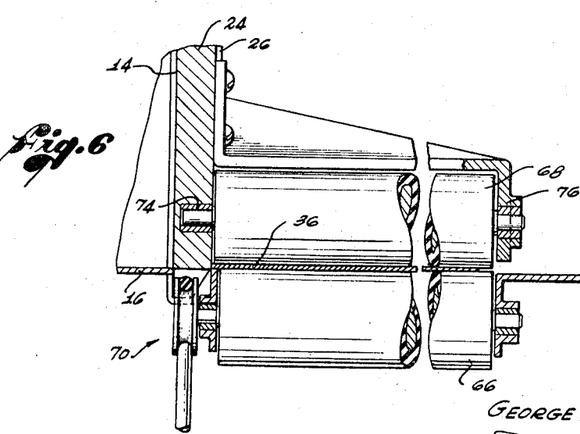
FIGURE 6 is an enlarged sectional view, taken along the line 6—6 in FIGURE 5, and illustrating the mechanism for stripping an authentic bill from the detection unit.

Referring now more particularly to FIGURES 2, 5 and 6, the operation of the system following insertion of the bill 36 is next described. After insertion of the bill 36 through the insert slot 18 in the panel 14, the bill rests upon a transparent or translucent plate 52 which is mounted within the housing 12 so that its upper surface is in the same horizontal plane as the platform surface 16. The depth of insertion of the bill 36 is limited by a suitable stop member 34 projecting above the plate 52, so that abutment of the leading edge of the bill with the stop will automatically assure proper alignment of the bill with a detection head 56 supported within the housing above the plate 52.

The light source 44 is supported below the plate 52 within a suitable enclosure 58 for directing light through the plate 52. As previously indicated, the light source 44 is energized only when the slide plate 24 has been moved to its lowermost position and, hence, access to the bill 36 while it is being tested is effectively prevented. The light passing through the plate 52 illuminates the bill 36 and passes through the bill with an intensity pattern duplicating the printed pattern upon the bill being tested.

The detection head 56 preferably comprises an array of photoelectric cells or the like arranged to read selected portions of the light pattern emanating from the bill 36, so that the pattern may be electronically evaluated with respect to the proper pattern for an authentic bill of selected denomination. In this respect, it will be apparent that the photoelectric cell array may be periodically altered to make the system less susceptible to paying out for counterfeit bills. Moreover, different arrays may be used for bills of different denomination, so that each individual unit 10 is capable of being customized to receive and evaluate bills of any single selected denomination. These same units may be subsequently modified for use with bills of a different denomination.

Figure 7:
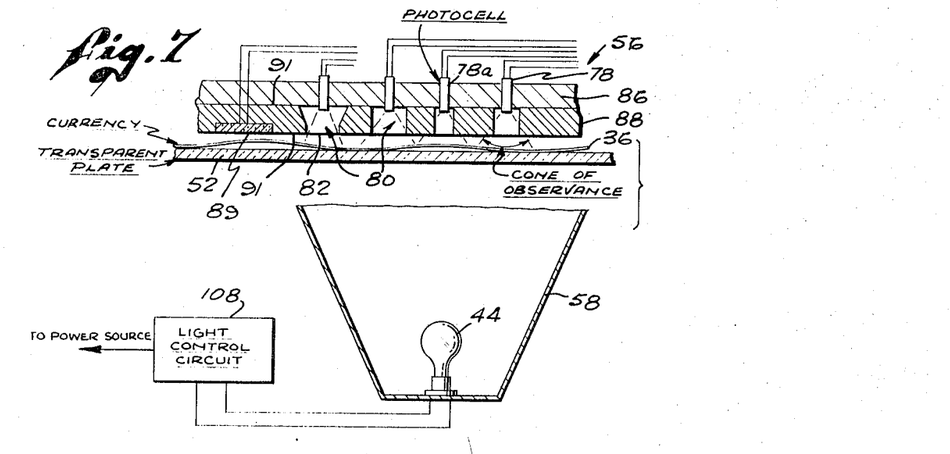
FIGURE 7 is an enlarged fragmentary sectional view of the detection head in FIGURE 2 and illustrates the manner in which the photocell observes the light transmitted through the irregularly shaped apertures of the cavities.

FIGURE 7 illustrates a preferred embodiment in which the photocells 78 are arranged in the detection head 56 of light impervious material. Each photocell 78 is contained in the bottom of a specially shaped cavity or enclosure 80 in the lower face 91 of the detection head 56. Since, during the testing process, the face of the detection head 56 is immediately adjacent the bill to be tested, the photocells 78 are separated from the bill 36 to be tested by a distance equal to the depth of the specially shaped cavity 80.

Each photocell 78 measures the amount of illumination in the specially shaped cavity 80 between the bill 36 and the photocell 78. With the use of a shaped cavity 80 a photocell 78 may respond to light transmitted through an area of the bill larger than the photocell diameter. Since the cavity may be shaped in almost any manner, the photocell 78 may observe an area on a particular currency which is peculiar to that currency. Thus, the usage of a number of shaped cavities 80 peculiar to the currency will greatly decrease the chances that another currency or printed pattern on paper presents the same illumination to the photocell as does the currency the pattern was made for. While shaped cavities are shown in the illustrative embodiment, it is possible to use enclosures of various kinds in which the entrance aperture 82 to the cavity or enclosure is specially shaped and the cavity itself is larger and of different shape than the shaped aperture 82. In this case the photocell measures the light transmitted through the shaped aperture 82.

Figure 8:
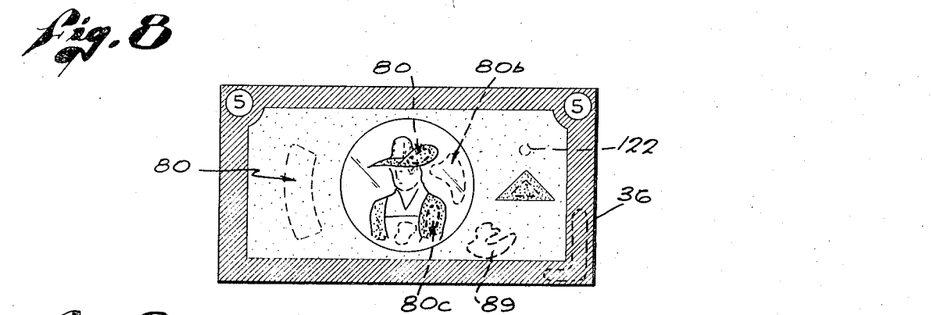
FIGURE 8 shows a group of irregularly shaped apertures in an illustrative embodiment of a detection head as they would appear with an illustrative bill overlying them.
Figure 9:
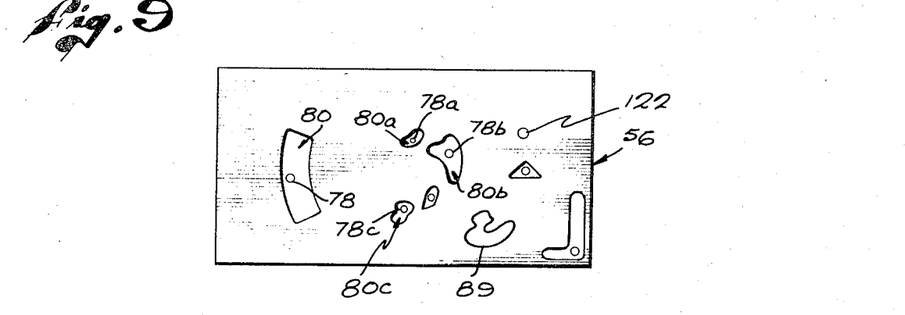
FIGURE 9 illustrates the detection head of FIGURE 8 with the bill removed so as to expose the photocells embedded in the cavities.

The shaped cavities 80 or aperture 82 in the detection head 56 are patterned so as to be peculiar to a particular type of currency. These shaped cavities or apertures 82 may be irregular, curved, rectangular or any shape that fits the pattern to be recognized and allows simple mounting and optics for the photocells. For example, if it is assumed that the currency 36 to be measured has a picture of a man with a sleeve having a single, color shading, as illustrated in FIGURES 8 and 9, then the cavity 80c or aperture 82 associated with a photocell 78c measuring that area would be shaped the same as the man's sleeve and would measure an intensity of light not likely to be found in any other piece of printed material or currency. This would not be possible if the photocell 78c were to be placed so that it touches the currency. Only the circular area of the cell itself on the currency would be observed by the photocell 78c. Note that the shaped area concept taught herein may be practiced by the use of large pieces of photocell material 89 shaped the same size as the shaped area on the bill. However, at the present state of the art this is economically impracticable.

When designing the shape and size of the cavity 80 or shaped aperture 82, the "cone of observance" 84 for the photocell 78 must be taken into account. This "cone of observance" is a solid angle outside of which light will not affect the photocell 78. Therefore, the shaped area which the photocell 80 must observe must be within the "cone of observance," otherwise the cell will not observe the entire area. Because of this, the photocell 80 must be recessed from the currency surface so that the diameter of the "cone of observance" cross section at the shaped area adjacent the currency is greater than the major dimensions of the shaped area (see FIGURE 7). With the shaped area within the "cone of observance" 84, the light transmitted through the shaped area of the currency and through the shaped cavity 80 or aperture 82 registers at the photocell 78.

The photocell 78 will then measure the light transmitted through the shaped aperture 82 into the cavity 80 and react accordingly by generating a voltage representing an indication of validity to a detection system 43. The detection system 43 sums this signal with the signals received from other photocells 78, 78a, 78b, etc., in other cavities and compares this composite voltage with a reference voltage chosen to reflect the proper composite voltage for a valid bill. If no error voltage exists, or if the error signal is within preset limits, when these signals are compared, then the bill is valid and a decision signal is sent to the control system 42 directing "acceptance of" the bill. If an error voltage of more than a predetermined magnitude exists, then a decision signal is directed to the control system 42 to "reject" the bill 36.

In the embodiment of FIGURE 7 the detection head 56 is made of two parts—a photocell block 86 and a cavity block 88. The photocells 78, 78a are imbedded in the photocell block 86 which must be of light impervious material. Various black plastic foams such as urethane foams have been used for this purpose because of their suitability for the purpose and the ease with which they may be produced in the proper shapes. The photocell block 86 shown in FIGURE 7 is of generally rectangular parallelopiped shape of substantially the same size as the currency to be tested with photocells 78, 78a imbedded in one of the two large faces in a pattern specifically chosen for the currency to be tested.

The cavity block 88 has a similar shape, but in the illustrative embodiment shown in FIGURE 9 is a precision stamped metal block having various shaped cavities 80, 80a, 80b. The block 88 has two opposed parallel large area faces 90, 91 and the cavity apertures 82 extend completely through the block from one of these faces to the other. This cavity block 88 is joined to the photocell block 86 in sandwich fashion so that each photocell 78, 78a, 78b and surrounding portion of the photocell block 86 serves to cap one of the apertures. Thus, when the photocell block 86 and the cavity block 88 are assembled, a detector head 56 is formed which has photocells 78, 78a, 78b recessed at the bottom of specially shaped cavities 80, 80a, 80b opening on a lower face 91 of substantially the same size as the currency to be tested. This lower face 91 is flat so as to allow all points of one side of a currency bill to be disposed at approximately the same distance from said surface 91 and immediately adjacent thereto.

The detection system 43 of the slide door bill detector is a transmitted light detection system which registers a response to any changes in the amount of light transmitted through selected portions of the currency being tested. The detectors are cadmium sulfide photocells 78 which are mounted in the photocell block 86 of the detection head 56 as described above. Changes in the intensity of the light to which the photocells 78 are exposed cause a change in the voltage appearing across the photocell 78 when it is being used as a series resistance element in a voltage divider network.

Figure 10:
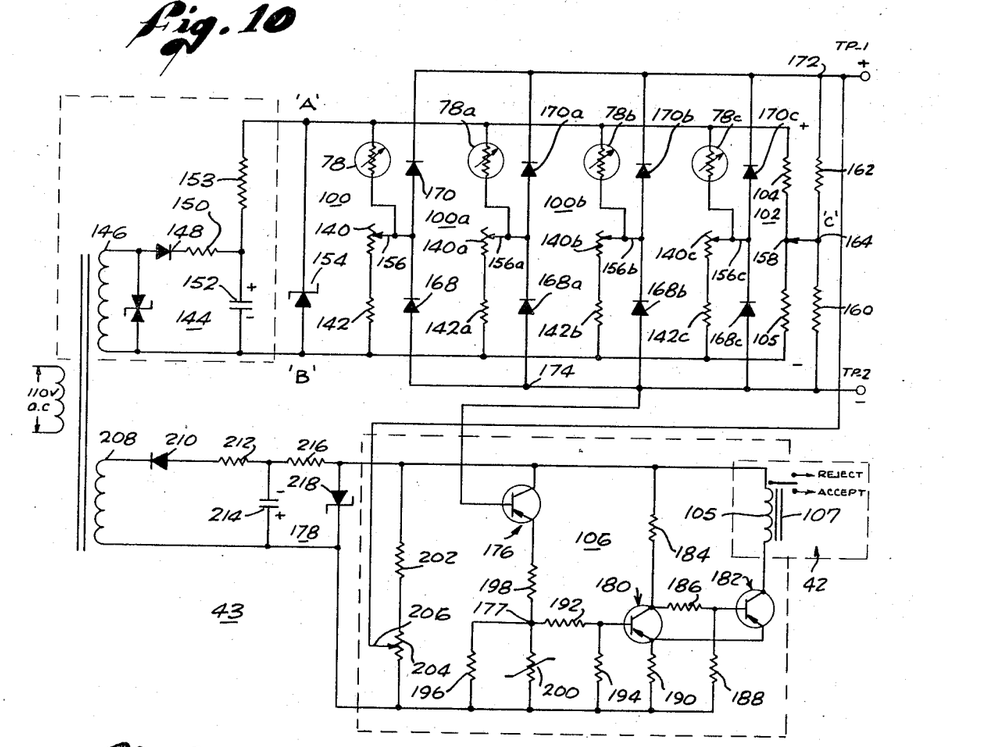
FIGURE 10 is a schematic of an illustrative embodiment of a detection system circuit.

An illustrative embodiment of the detection system 43 as schematically illustrated in FIGURE 10 comprises a DC bridge in which each cadmium photocell 78, 78a, 78b, 78c and its associated resistors 140, 140a, 140b, 140c and 142, 142a, 142b, 142c form a branch 100, 100a, 100b, 100c which is balanced against a fixed branch 102 which may be comprised of two resistors in series 104 and 105. All of the cell branches 100, 100a, 100b, 100c are in parallel and thus in accordance with well known bridge theory, the decision signal output of the bridge will be depended upon the sum of the error voltage signals appearing in the individual branches. Each photocell 78, 78a, 78b, 78c and its associated balancing resistor 140, 140a, 140b, 140c is adjusted so that when valid currency is properly inserted in the detection area, a null will be obtained and no error signal will appear at the output 172, 174 of the detection system 43. A null or lack of error signal indicates that each photocell is measuring an illumination value in its associated cavity 80 which is proper for the currency being tested and hence the proper voltage for which the branch 100 is adjusted appears across the photocell 78. In the event that any cavity 80 is receiving more or less illumination than the value for which its associated photocell branch 100 is adjusted, the voltage appearing across the associated photocell 78 will change accordingly and a positive or negative error voltage signal will be generated by this branch 100. Since all of the cell branches 100, 100a, 100b, 100c are connected in parallel to the fixed branch 102 of the bridge, the decision signal output of the detection system 43 will be the sum of the error signals generated by all of the cells.

While the error signal resulting from individual photocell branches can be either positive or negative, depending upon the paper or currency to be tested, it is desirable to have a decision output signal of a single polarity to feed to a trigger circuit 106 which will actuate the vending 105 of the decision relay 107. Therefore, a novel DC bridge circuitry is used which will furnish a uni-directional summing signal to the input of the electronic trigger circuit 106 regardless of whether the signals in the individual cells 78, 78a go positive or negative. A direct current bridge with a uni-direction output signal as disclosed in the present invention has the advantage that a 100% of the error signal is there 100% of the time whereas in an AC bridge only 63.2% of the error signal is there and it is there only 50% of the time. Thus, more information is derived from the disclosed DC bridge configuration because there is full time error signal and there is less chance of error by the detection system.

Referring now to FIGURE 10, the cells 78 used in the illustrative embodiment detection system 43 consist of photocells 78, 78a, 78b, 78c. Each cell is connected in series with an adjustment potentiometer 140, 140a, 140b, 140c which is connected in series to a resistor 142, 142a, etc. The photocell 78, adjustment potentiometer 140 and series resistor 142, form a branch 100 of a photocell bridge. The same is true for the other photocells 78a, 78b, etc., and their respective adjustment potentiometers 140a, 140b, etc., and series resistors 142, 142b, etc.

All of the photocell branches 100, 100a, 100b, etc., are in parallel with each other and with the reference branch 102 composed of series resistors 104 and 105. All of the branches 100, 100a, etc., and the reference branch 102 are across the DC output appearing at reference points A and B from the half wave rectifier circuit 144 which derives its power from the AC line through transformer winding 146. The diode 148 and the filter elements consisting of resistor 150 and capacitor 152 convert the AC output of the transformer to a half wave filtered DC output voltage appearing at reference points "A" and "B" of FIGURE 10. Zener diode 154 and resistor 153 serve to regulate this output voltage in the standard manner.

With a valid bill of average age and condition inserted in the detection area for sensing by the detection head 56, each adjustable potentiometer 140, 140a, etc., should be adjusted so that no voltage is measurable (null condition) between the sliding contact 156, 156a, etc., and junction 158 of reference branch 102. In the case of a counterfeit bill, some or all of the photocells 78, 78a, etc., will be exposed to greater or lesser illumination than the standard in their respective cavities 80, 80a, etc., and will thus generate positive or negative error voltages at their associated potentiometer sliding contacts 156, 156a, etc., with respect to junction 158 of reference branch 102.

Unless apparatus is provided for converting these positive and negative voltages to uni-directional error signals, cancellation will take place when the errors are summed and an improper summed error signal which will not convey a useable signal to the trigger circuit 106 may result. As shown in FIGURE 10, the DC bridge used in the detection system 43 differs from the ordinary DC bridge in that additional circuit elements are added to form a bridge configuration consisting of diodes 168 and 170 and resistors 160 and 162 within a bridge to convert error signals which may go either positive or negative to signals of a single polarity so as to provide a useful signal to the trigger circuitry 106. Thus, two series resistors 160 and 162 are connected at their junction 164 to junction 158, the reference point for the error voltages generated by each photocell branch 100, 100a, etc. For each such photocell branch 100, 100a, etc., a pair of series connected diodes 168 and 170, 168a and 170a, etc., are connected across resistors 160 and 162. The junction 166, 166a, etc., between the two diodes of each branch is connected to the sliding contact 156, 156a, etc., of each photocell branch 100, 100a, etc., at which point the error voltage of the photocell branch 100, 100a appears. The output of the bridge configuration within a bridge is a single polarity signal which appears at the junctions 172 and 174 between the diodes 168 and 170, 168a and 170a, etc., and resistors 160 and 162.

In operation both positive or negative voltage changes appearing at the sliding contacts 156, 156a of the photocell branches will appear as single polarity voltages between junction points 172 and 174. For example, if a positive error voltage appears at sliding contact 156, current will flow through photocell 78, diode 170, resistor 162 and resistor 105 causing junction 172 to be positive with respect to junction 174 since diode 168 blocks current flow from junction 174 to slide contact 156 and keeps junction 174 at the potential of junction 158 which is less positive than the potential of junction 172. The same result obtains if a negative error voltage appears at sliding contact 156. In this event current will flow through resistor 104, resistor 160, diode 168 and resistor 142 and again cause junction 172 to be positive with respect to junction 174, since diode 170 blocks current flow from junction 172 to slide contact 156 and keeps junction 172 at the positive potential of junction 158 which is greater than the potential of junction 174.

Thus, all of positive and negative error voltages from the photocell branches appear as positive error voltages between junctions 172 and 174 and are summed to give a single positive error voltage appearing between these junctions. This positive error voltage is fed into the base of PNP transistor 176 where it moves the transistor toward cutoff and increases its impedance. Since transistor 176 is connected to a separate DC power supply 178 as an emitter follower, it presents a high input impedance to the cell bridge detection circuitry 43 thereby relieving the loading effect of the detection circuitry 43 on the trigger circuit 106. Also, since the output of transistor 176 is tapped at the junction 177 of a voltage divider network in the emitter circuit connecting the emitter to B+, any increase in impedance of transistor 176 results in a negative output signal to be fed to the input of the trigger circuit 106.

In summary, the positive and negative photocell branch voltages are summed between junctions 172 and 174 as a single positive error voltage which increases the impedance of transistor 176 and causes a negative emitter output. Thus, either a positive or a negative voltage change at the photocell branches 100, 100a, etc., results in a negative output in the emitter follower circuit of transistor 176.

This negative output is then fed through the input voltage divider consisting of resistors 192 and 194 into a conventional Schmitt trigger circuit consisting of transistors 180 and 182, resistors 184, 186, 188 and 190 having as an output the coil 105 of decision relay 107 which has "accept" and "reject" contacts which actuate the control system 42 which in turn operates to accept or reject the bill under test and pay out coins or dispense merchandise if the bill is valid.

The network of resistors 196 and 198 and thermistor 200 act as a temperature compensating network. As the temperature decreases or rises, this network compensates for the amount of negative voltage change that the Schmitt trigger circuit requires. Resistor 202 and potentiometer 204 form a series divider across the DC power source 178 for the trigger circuit 106 and are used as a sensitivity control for the decision circuitry. This establishes a reference voltage which is analogous to the leakage voltage which occurs at the emitter of transistor 176. Junction 174 is connected to the sliding tap 206 of potentiometer 204. DC voltage for negative pulse transistor 176 and the Schmitt trigger circuit 106 are furnished through a separate winding 208 on the same transformer 146 used for the photocell bridge DC supply. The AC output of winding 208 is rectified by diode 210 and is filtered by resistor 212 and capacitor 214. Regulation is supplied by resistor 216 and Zener diode 218.

The electrical output from the detection system 43 is directed as an input to control system 42 through the decision relay 107 which actuates the control system to either accept the bill and dispense change or to reject the bill and return it to the customer. If the bill 36 is authentic, the control system energizes appropriate stripping means for removing the bill 36 from beneath the detection head 56 and depositing the bill in a suitable money box 60. The control system 42 also provides, upon receipt of an authentic bill, a command signal output which is directed to a dispensing device 62, to cause the latter to dispense merchandise and/or pay out change through the appropriate chute 63 shown in FIGURE 1.

After the bill 36 has been stripped from beneath the detection head 56, the control system 42 generates a signal for momentarily energizing the solenoid 34, so that the slide plate 24 is unlocked and returned to its normally raised position in FIGURE 2. If the bill 36 is not authentic, the control system 42 does not energize stripping means or the dispensing device, but rather merely energizes the solenoid 34. In this latter instance, when the slide plate 24 is raised, the consumer can remove the rejected bill and insert a new one.

The stripping means for removing an authentic bill includes a stripper motor 64 which drives a pair of resilient stripping rollers 66, 68 through a conventional pulley and drive belt arrangement 70 or the like. The lower roller 66 is a driving roller journaled for rotation below the plate 52, and adapted to engage the underside of the bill 36 through a clearance opening 72 in the plate 52. The upper roller 68 is an idler roller carried by the slide plate 24, one end of the roller being journaled in the plate itself at 74 with the other end journaled in a suitable bracket 76 mounted upon the plate 24. Hence, when the slide plate 24 is lowered, the idler roller 68 engages the upper face of the bill 36 and pinches the bill between the idler roller and the driving roller 66. Therefore, when the stripper motor 64 is energized by the control system 42, the rollers 66 and 68 both rotate to strip the bill 36 from beneath the detection head 56.

Figure 11:
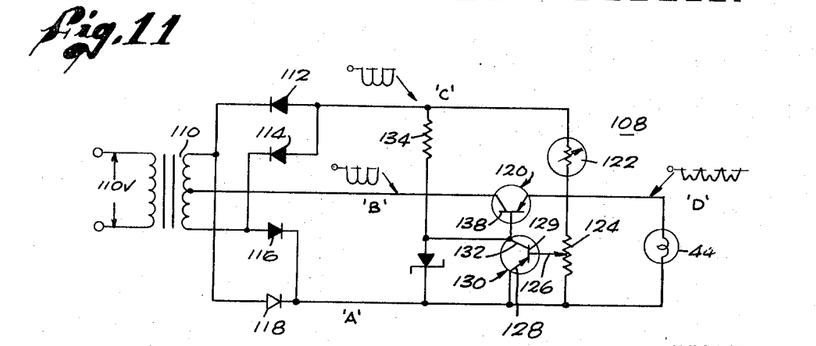
FIGURE 11 is a schematic of an illustrative embodiment of a light control circuit.

The circuit 108 disclosed in FIGURE 11 automatically adjusts the detection system to correctly detect all valid bills regardless of their age, condition or degree of cleanliness. If a bill is old and dirty, the light transmission through the bill is less than for a crisp new bill. The light control circuit 108 compensates for age and dirt by adjusting the intensity of the light which is presented to the bills for testing by the detection head 56. This circuit 108 automatically adjusts the overall light intensity or output so that the cavities 80 will get the same illumination for any valid bill regardless of its age or condition.

Power for the circuit 108 is provided through a transformer 110 which isolates the circuit from the AC power source and steps the line voltage down to a value suitable for transistor operation. Three output levels of DC voltage are provided by two full wave diode connections using diodes 112, 114, 116 and 118. Point A will be considered the reference voltage level with point B being at a level more negative than A and point C being more negative than B. Transistor 120 acts as a series regulator and is inserted in series with the light source 44 which is connected to the DC output of the power source between voltage levels A and B. As the impedance of transistor 120 is increased, the light intensity of light source 44 decreases and vice versa. Thus, transistor 120 and light source 44 form a voltage divider across voltage levels A and B.

A sensing photocell 122 is placed in series with a variable resistor 124 to form a voltage divider across the full wave power supply output between reference levels A and C. Resistor 124 has a sliding tap 126 which is connected to the base of transistor 130. The output of this tap 126 serves as a feedback signal and the setting of the sliding tap 126 sets the reference level or input signal which sets the light source 44 at the proper intensity for a bill of average age and condition. This photocell 122 is located in the detection head 56 and measures the light transmission characteristics of a portion of the bill selected to give a good indication of the age and condition of the bill. The photocell measures this by sensing variations in the intensity of the lamp source 44 which serves as output of the light control circuit. These variations can be caused by either supply voltage fluctuations to the lamp or differences in light transmission caused by bills of different ages and conditions. For example, since a light area of the bill will tend to darken with age and dirt, this portion of the bill might be chosen as the test area for photocell 122.

In operation, if the bill is old and dirty less light will be transmitted to sensing photocell 122 causing the voltage across it to increase because of an increase in impedance due to the inherent characteristics of the photocell. This will cause the voltage at the variable tap 126 of series resistor 124 which is series connected to sensing photocell 122 to go more positive toward reference level A. This causes the base 129 of control transistor 130 to go more positive and tends to move the transistor toward cutoff and increases its impedance. Since the emitter 128 of transistor 130 is at voltage level A as shown in FIGURE 11 and the collector 132 is connected to one end of resistor 134 which is connected at its other end to voltage level C, the voltage level at the collector 132 will vary as the impedance of transistor 130 varies.

As sensing photocell 122 receives a decreased illumination from a dirty bill, control transistor 130 goes toward cutoff and its impedance increases as described above. This causes the voltage at its collector 132 to go more negative. The base 138 of transistor 120 is connected to the collector 132 of transistor 130 and the action of collector 132 causes the base of transistor 120 to go more negative thereby lessening the impedance of transistor 120. A lessened impedance in the series regulator transistor 120 causes the current in the light source 44 to increase, thereby increasing the light intensity. This increased light intensity causes the illumination of the sensing photocell 122 to increase because of an increased light transmission through the dirty bill. When the sensing photocell 122 receives the proper illumination its impedance ceases to change and no further change occurs in the light intensity. Conversely, a new or exceptionally clean bill will cause the impedance of the sensing photocell 122 to decrease thereby increasing the impedance of series regulator transistor 120 and decreasing the light intensity.

The variable tap 126 of resistor 124 is used to adjust the intensity of the light source 44 to give proper illumination which will allow the bridge of the detection system 43 to balance out for a bill of average condition and cleanliness. The sensing photocell 122 and the light control circuit 108 will then automatically compensate to provide proper illumination for new clean bills or old or dirty bills. Reference is made to James M. Buchanan, U.S. patent application Ser. No. 452,324 entitled, "Control Circuit," and filed on Apr. 30, 1965, concurrently with the present patent application.

It is to be understood that the above described arrangements are illustrative of the application of the principles of invention. Numerous other arrangements within the scope of the invention may be devised by those skilled in the art. Thus, by way of example and not of limitation, the "photocells" or "light sensitive cells" may take the form of conventional photo tubes or other known devices which produce a change in an electrical characteristic with variations of incident light, such as photovoltaic cells, photovaristors, phototransistors and the like. In addition, a semiconductive device with a broad area surface p-n junction may be substituted for the shaped aperture and associated photocell. It is also noted that, while transmission through the bill is to be preferred, devices which are sensitive to reflected light from selected irregularly shaped areas on the paper currency may also be employed.

Concerning another aspect of the invention, when the term bill or paper currency is employed in the present specification or claims, it is understood that bonds, stock certificates or the like are encompassed by these terms.

Accordingly, from the foregoing it is evident that various changes may be made in the present invention without departing from the spirit of the invention as defined in the appended claims.

What is claimed is:
1. In a device for receiving and evaluating paper currency of a selected denomination:
   a housing;
   a bill detector within said housing;
   means permitting hand insertion of a bill within said detector;
   means for denying access to the bill during test;
   means for transmitting light through a bill under test;
   a plurality of cavities;
   irregularly shaped apertures overlying at least some of said cavities; and
   a light sensitive cell located in each of said cavities and spaced sufficiently from a bill under test so as to respond to all of the light transmitted through irregularly shaped areas of the bill overlying said irregularly shaped apertures.
2. The device of claim 1 including a detection system for actuating a dispensing mechanism if the photocells receive the proper light transmitted into each cavity.
3. The device of claim 2 wherein said detection system includes a reference means; and means for comparing the light observed by each light sensitive cell with said reference means.
4. The device of claim 3 wherein the detection system includes means for converting positive and negative comparison signals from said comparing means into a uni-polarity decision signal.
5. The device of claim 4 including means for actuating a dispensing device in response to such uni-polarity signal; and means for directing said uni-polarity decision signal to said actuating means.
6. The detection system of claim 2 including:
   a power source;
   reference means connected across said power source;
   means for connecting each of said light sensitive cells in parallel with said reference means;
   a first set of output terminals connected respectively to receive output signals from each of said light sensitive cells, and a second output terminal connected to said reference means;
   third and fourth output terminals;
   a voltage divider means connected across said third and fourth output terminals;
   at least one pair of series connected diodes connected across said third and fourth output terminals for each light sensitive cell;
   means for electrically connecting at least one of said diode pairs to one of said first output terminals;
   means for electrically connecting said voltage divider means to said second output terminal; and
   adjustment means for setting the potential between said third and fourth terminals to a null.
7. A device for evaluating the validity of paper currency of a selected denomination by comparing the light transmitted through shaped areas of a bill interposed between a light source and the detection system comprising:
   a plurality of separate cavities, some of said cavities having irregularly shaped apertures; and
   an equal plurality of light sensitive cells inside said cavities spaced sufficiently from a bill under test so as to respond to substantially all of the light transmitted through each shaped area of the bill overlying the corresponding aperture to the cavity.
8. The combination claim 7 wherein the cavities are irregularly shaped, having apertures corresponding to predetermined irregularly shaped zones of the bill to be tested.
9. The combination of claim 7 wherein the photocell is spaced a sufficient distance from the bill so that substantially all of the irregularly shaped area of the cavity aperture falls within the photocell cone of observance.
10. The combination of claim 8 wherein the cross sectional shape and area of the cavity is the same as that of the aperture at any point along the major axis of the cavity.

11. In a device for receiving and evaluating paper currency of a selected denomination:
  a housing;
  a bill detector within said housing;
  means for insertion of a currency bill within said detector;
  means for denying access to the bill under test;
  compensating means for compensating for the condition of the bill under test, including light intensity control means for transmitting light through the bill;
  said light intensity control means including a power source;
  an output lamp;
  a variable impedance control element serially connected between said power source and said output lamp;
  means for generating an error signal in response to changes in intensity of said lamp;
  an input signal for setting the correct intensity of said lamp;
  means for summing said error signal and said input signal;
  means connecting said error signal generator to said summing means;
  means connecting said summing means to said control means; and
  said detector having means for measuring substantially all of the light transmitted through each of a plurality of irregularly shaped areas of the bill to be tested.

12. The device of claim 11 where the light control means includes:
  a first power source;
  a first voltage divider, including a variable impedance element and a lamp connected in series, connected across the terminals of said first power source;
  a second power source having a terminal common to said first power source;
  a second voltage divider, including a light sensitive variable impedance element and at least one resistor connected in series, connected across the terminals of said second power source, said light sensitive element located so as to be illuminated by said lamp,
  an output terminal on a resistor in said second voltage divider;
  control means for controlling said variable impedance element so as to vary the voltage across said lamp in response to a change in voltage at said output terminal; and
  means for electrically connecting said output terminal ti said control means.

13. A bill detection system comprising:
  means for denying access to the bill while it is being tested;
  a body defining a plurality of cavity means of irregularly shaped cross sectional areas;
  light sensitive means for individually measuring the illumination of each of said cavity means;
  means for illuminating said cavity means;
  means for holding a bill to be tested interposed between the light source and the cavity means and overlying said cavity means;
  means for providing a reference illumination value;
  comparison means for comparing illumination of the cavity means with the reference illumination value; and
  means for generating a control signal when the illumination of said cavity means is different from the reference illumination value.

14. A detection system for determining the validity of a bill having a printed pattern including a plurality of predetermined differently shaped zones of distinctive configuration comprising:
  means for denying acces to bill during tests;
  light transmission control means having a corresponding plurality of differently shaped light transmitting openings positioned and shaped to correspond to said predetermined differently shaped zones of distinctive configurations;
  a plurality of detection means for simultaneously measuring the light transmitted through each of said differently shaped openings;
  means for illuminating said light transmission control means; and
  means for holding said bill between the light source and the light transmission control means and overlying said light transmission control means.

15. In a device for receiving and evaluating paper currency of a selected denomination:
  a housing;
  means permitting hand insertion of a bill within said detector;
  means for denying access to the bill during test;
  means for transmitting light through a bill under test;
  a plurality of separate enclosures, some of said enclosures having irregularly shaped apertures;
  light sensitive cells located in each of said enclosures and spaced sufficiently from a bill under test so as to respond to all of the light transmitted through shaped areas of the bill overlying said irregularly shaped apertures;
  reference means;
  means for comparing the light observed by each light sensitive cell with said reference means;
  means for converting positive and negative comparison signals from said comparing means into a uni-polarity decision signal;
  means for actuating a dispensing device in response to such uni-polarity signal;
  means for directing said uni-polarity decision signal to said actuating means; and
  means for compensating said light source for the condition of the bill being tested.

16. In a device for receiving and evaluating paper currency of a selected denomination:
  a housing;
  a bill detector within said housing;
  means permitting hand insertion of a bill within said detector;
  means for denying access to the bill during test;
  means for transmitting light through a bill under test;
  a plurality of separate enclosures, some of said enclosures having irregularly shaped apertures;
  light sensitive cells located in each of said enclosures and spaced sufficiently from a bill under test so as to respond to all of the light transmitted through shaped areas of the bill overlying said irregularly shaped apertures;
  a first power source;
  reference means connected across said first power source;
  means for connecting each of said light sensitive cells in parallel with said reference means;
  a first set of output terminals connected respectively to receive output signals from each of said light sensitive cells, and a second output terminal connected to said reference means;
  third and fourth output terminals;
  a voltage divider means connected across said third and fourth output terminals;
  at least one pair of series connected diodes connected across said third and fourth output terminals for each light sensitive cell;
  means for electrically connecting at least one of said diode pairs to one of said first output terminals;
  means for electrically connecting said voltage divider means to said second output terminal;

adjustment means for setting the potential between said third and fourth terminals to a null;
a second power source;
an output lamp connected to said second power source;
a control element controlling the power supplied to said output lamp;
means for generating an error signal in response to changes in intensity of said lamp;
an input signal for setting the correct intensity of said lamp;
means for summing said error signal and said input signal;
means connecting said error signal generator to said summing means; and
means connecting said summing means to said control means.

References Cited
UNITED STATES PATENTS

| | | | |
|---|---|---|---|
| 2,411,672 | 11/1946 | Akker | 88—14 |
| 3,108,693 | 10/1963 | Patzer | 194—4 X |
| 3,246,297 | 4/1966 | Silverstein et al. | 340—149 |
| 3,258,098 | 6/1966 | Hooker | 194—4 |

ROBERT B. REEVES, *Primary Examiner.*

STANLEY H. TOLLBERG, *Examiner.*